United States Patent
Tang

(10) Patent No.: US 11,956,815 B2
(45) Date of Patent: Apr. 9, 2024

(54) CHANNEL DETECTION METHOD AND DEVICE AND INFORMATION TRANSMISSION METHOD AND DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 497 days.

(21) Appl. No.: 17/214,569

(22) Filed: Mar. 26, 2021

(65) Prior Publication Data
US 2021/0219339 A1 Jul. 15, 2021

Related U.S. Application Data

(63) Continuation of application No. PCT/CN2018/108095, filed on Sep. 27, 2018.

(51) Int. Cl.
*H04W 74/08* (2009.01)
*H04L 1/1812* (2023.01)
*H04W 16/14* (2009.01)

(52) U.S. Cl.
CPC .......... *H04W 74/08* (2013.01); *H04L 1/1812* (2013.01); *H04W 16/14* (2013.01)

(58) Field of Classification Search
CPC ...... H04W 74/08; H04W 16/14; H04L 1/1812
See application file for complete search history.

(56) References Cited

U.S. PATENT DOCUMENTS

2020/0100284 A1* 3/2020 Li ................... H04W 74/0808
2021/0298075 A1* 9/2021 Talarico ........... H04W 74/0808

FOREIGN PATENT DOCUMENTS

| CN | 104604175 A | 5/2015 |
|---|---|---|
| CN | 107027123 | 8/2017 |
| CN | 107624265 | 1/2018 |
| CN | 108141311 | 6/2018 |

OTHER PUBLICATIONS

R1-1808895 Oppo "HARQ enhancements for NR-U" 3GPP WG1 #94 Gothenburg Aug. 20-24, 2018 (Year: 2018).*
EPO, Office Action for EU Application No. 18935593.6, dated Dec. 14, 2022.

(Continued)

*Primary Examiner* — Basil Ma
(74) *Attorney, Agent, or Firm* — Hodgson Russ LLP

(57) ABSTRACT

Provided are a channel detection method and device and an information transmission method and device. The channel detection method comprises: a transmission device determining a CWS for channel detection according to first information, wherein the first information comprises feedback information corresponding to a reference physical channel and transmitted by the transmission device on an unlicensed carrier, and the feedback information comprises at least one of TB-HARQ information and CBG-HARQ information; and the transmission device performing channel detection on the unlicensed carrier according to the CWS.

7 Claims, 3 Drawing Sheets

(56) References Cited

OTHER PUBLICATIONS

CNIPA, Request for CNIPA Patent Priority Review for CN Application No. 202111495290.8, dated Sep. 23, 2022.
EPO, Communication for EP Application No. 18935593.6, dated Jun. 1, 2022.
Huawei et al., "Coexistence and channel access for NR unlicensed band operations," 3GPP TSG RAN WG1 Meeting #94, R1-1808061, Aug. 2018, 8 pages.
EPO, Extended European Search Report for EP Application No. 18935593.6, dated Sep. 13, 2021.
Intel Corporation, "Enhancements to channel access mechanism for NR-unlicensed," 3GPP TSG RAN WG1 Meeting #94, R1-1808685, Aug. 2018, 10 pages.
Samsung, "HARQ enhancements for NR-U," 3GPP TSG RAN WG1 Meeting #94, R1-1808770, Aug. 2018, 6 pages.
Wilus Inc., "Discussion on channel access procedure for NR-U operation," 3GPP TSG RAN WG1 Meeting #94, R1-1809325, Aug. 2018, 3 pages.
WIPO, International Search Report and Written Opinion for PCT/CN2018/108095, dated Jun. 3, 2019.
CNIPA, First Office Action for CN Application No. 202111495290.8, dated Jan. 4, 2023.

\* cited by examiner

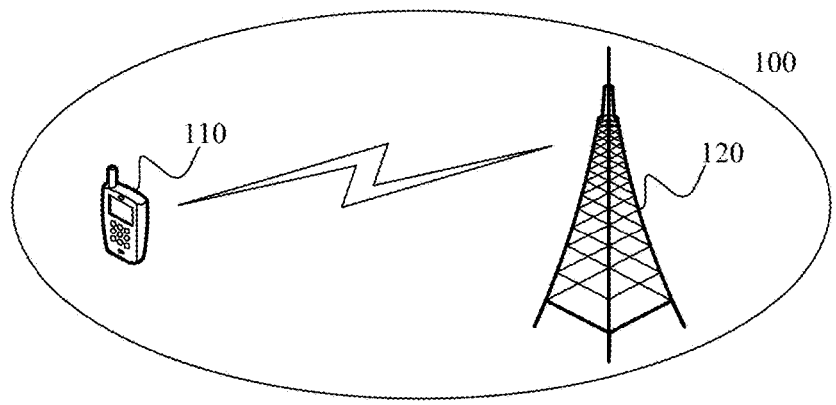
FIG. 1
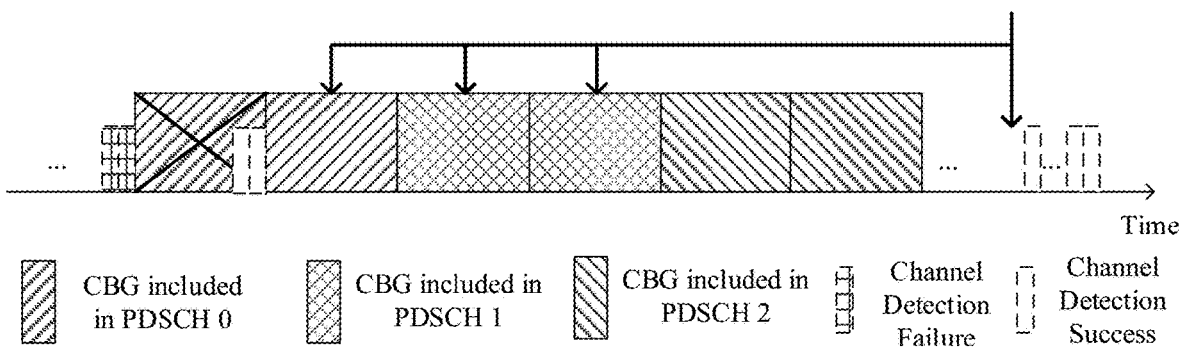
FIG. 2
FIG. 3

CHANNEL DETECTION METHOD AND DEVICE AND INFORMATION TRANSMISSION METHOD AND DEVICE

CROSS-REFERENCE TO RELATED APPLICATIONS

The present application is a continuation of International Application No. PCT/CN2018/108095, filed on Sep. 27, 2018, the entire disclosure of which is incorporated herein by reference.

TECHNICAL FIELD

Embodiments of the present disclosure relate to the field of communication, and more particularly, to a channel detection method and device and an information sending method and device.

BACKGROUND

An unlicensed spectrum is a spectrum that can be used for radio device communication allowed by a country and region. This spectrum is usually considered to be a shared spectrum, that is, communication devices in different communication systems can use this spectrum as long as regulatory requirements set by the country or region on the spectrum are met, and there is no need to apply for a proprietary spectrum authorization from the government. For example, in some regions, the communication devices follow a principle of "listen before talk", that is, the communication device needs to perform channel interception before sending signals on channels of the unlicensed spectrum. Only when a channel interception result is that the channel is idle, the communication device can perform signal transmission; if the channel interception result of the communication device on the channel of the unlicensed spectrum is that the channel is busy, the communication device cannot perform the signal transmission. With developments of wireless communication technologies, both a LTE system and a NR system will consider deploying networks on the unlicensed spectrum to use the unlicensed spectrum to transmit data services.

At present, in a system where LTE is applied to the unlicensed spectrum, when a network device is performing contention window (CW) based channel access, the network device needs to maintain and adjust a CWS (Contention Window Size) based on HARQ-ACK information of a PDSCH. A terminal device performs hybrid automatic repeat request (HARQ) feedback based on a transmission block (TB).

SUMMARY

There is provided a channel detection method and device and an information sending method and device.

In a first aspect, there is provided a channel detection method, including:

determining, by a sending device, a contention window size (CWS) for channel detection according to first information, wherein the first information includes feedback information corresponding to a reference physical channel sent by the sending device on an unlicensed carrier, and the feedback information includes at least one of transmission block-hybrid automatic repeat request (TB-HARQ) acknowledgment information and code block group-hybrid automatic repeat request (CBG-HARQ) information; and performing, by the sending device, channel detection on the unlicensed carrier according to the CWS.

In some possible implementations, at least part of time resources in transmission resources of the reference physical channel is located in a reference time unit.

In some possible implementations, the reference time unit includes:

a first time unit or first two time units in a latest transmission performed by the sending device on the unlicensed carrier before determining the CWS by the sending device.

In some possible implementations, the reference time unit includes:

a first sub-frame or first two sub-frames in a latest transmission performed by the sending device on the unlicensed carrier before determining the CWS by the sending device.

In some possible implementations, when the reference physical channel sent by the sending device on the unlicensed carrier does not include a first CBG, the first information does not include first CBG-HARQ information corresponding to the first CBG.

In some possible implementations, when the reference physical channel sent by the sending device on the unlicensed carrier does not include a first CBG, the first information includes first CBG-HARQ information corresponding to the first CBG.

A resource assigned to the reference physical channel in frequency domain is a resource in a first bandwidth part (BWP); wherein, the performing, by the sending device, the channel detection on the unlicensed carrier according to the CWS includes:

performing, by the sending device, the channel detection on a second BWP on the unlicensed carrier according to the CWS.

In some possible implementations, the first BWP is a subset of the second BWP, and the first information includes at least one of TB-HARQ information and CBG-HARQ information corresponding to the reference physical channel.

In some possible implementations, the second BWP is a subset of the first BWP, and the first information does not include TB-HARQ information corresponding to the reference physical channel.

In some possible implementations, the second BWP is a subset of the first BWP, and the first information includes CBG-HARQ information corresponding to a CBG transmitted on the second BWP by the reference physical channel.

In some possible implementations, the sending device is a network device, a receiving device is a terminal device, and the reference physical channel is a physical downlink shared channel (PDSCH).

In some possible implementations, the sending device is a terminal device, a receiving device is a network device, and the reference physical channel is a physical shared channel (PUSCH).

In a second aspect, there is provided an information sending method, including:

receiving, by a receiving device, a reference physical channel sent by a sending device on an unlicensed carrier; and sending, by the receiving device, feedback information corresponding to the reference physical channel to the sending device, wherein the feedback information includes at least one of transmission block-hybrid automatic repeat request (TB-HARQ) acknowledgment information and code block group-hybrid automatic repeat request (CBG-HARQ) information.

In some possible implementations, at least part of time resources in transmission resources of the reference physical channel is located in a reference time unit.

In some possible implementations, the reference time unit includes:

a first time unit or first two time units in one transmission performed by the receiving device on the unlicensed carrier.

In some possible implementations, the reference time unit includes:

a first sub-frame or first two sub-frames in one transmission performed by the receiving device on the unlicensed carrier.

When the reference physical channel received by the receiving device on the unlicensed carrier does not include a first CBG, the feedback information includes first CBG-HARQ information corresponding to the first CBG.

In some possible implementations, the first CBG-HARQ information is negative acknowledgment (NACK) information.

In some possible implementations, the receiving, by the receiving device, the reference physical channel sent by the sending device on the unlicensed carrier includes:

receiving, by the receiving device, the reference physical channel sent by the sending device on a first bandwidth part (BWP).

In some possible implementations, the receiving device is a terminal device, the sending device is a network device, and the reference physical channel is a physical downlink shared channel (PDSCH).

In some possible implementations, the receiving device is a network device, the sending device is a terminal device, and the reference physical channel is a physical shared channel (PUSCH).

In a third aspect, there is provided a communication device, which is configured to execute the method in any one of the first to second aspects or the method in any of the foregoing possible implementations.

In some possible implementations, the communication device includes:

functional modules configured to execute the method in any one of the first to second aspects or the method in any of the foregoing possible implementations.

In some possible implementations, the communication device is a sending device, and the sending device is configured to execute the method in the first aspect or the method in any of the possible implementations of the first aspect.

In some possible implementations, the communication device is a receiving device, and the receiving device is configured to execute the method in the second aspect or the method in any of the possible implementations of the second aspect.

In a fourth aspect, there is provided a communication device, including:

a processor, configured to call and run a computer program from the memory, and the computer program is configured to execute the method in any one of the first to second aspects or the method in any of the foregoing possible implementations.

In some possible implementations, the communication device further includes:

a memory for store the computer program.

In some possible implementations, the communication device is a sending device, and the sending device is configured to execute the method in the first aspect or the method in any of the possible implementations of the first aspect.

In some possible implementations, the communication device is a receiving device, and the receiving device is configured to execute the method in the second aspect or the method in any of the possible implementations of the second aspect.

In a fifth aspect, there is provided a chip configured to execute the method in any one of the first to second aspects or the method in any of the foregoing possible implementations.

In some possible implementations, the chip includes:

a processor, configured to call and run a computer program from the memory, and the computer program is configured to execute the method in any one of the first to second aspects or the method in any of the foregoing possible implementations.

In some possible implementations, the chip further includes:

a memory for store the computer program.

In a sixth aspect, there is provided a computer-readable storage medium for storing a computer program, and the computer program is configured to execute the method in any one of the first to second aspects or the method in any of the foregoing possible implementations.

In a seventh aspect, there is provided a computer program product, including computer program instructions, and the computer program is configured to execute the method in any one of the first to second aspects or the method in any of the foregoing possible implementations.

In an eighth aspect, there is provided a computer program, which when running on a computer, causes the computer to execute method in any one of the first to second aspects or the method in any of the foregoing possible implementations.

In a ninth aspect, there is provided a communication system, including a sending device and a receiving device.

In some possible implementations, the sending device is configured to execute the method in the first aspect or the method in any of the possible implementations of the first aspect, and the receiving device is configured to execute the method in the second aspect or the method in any of the possible implementations of the second aspect.

BRIEF DESCRIPTION OF THE DRAWINGS

FIG. 1 is an example of an application scenario of the present disclosure.

FIG. 2 is a schematic flowchart of a channel detection method according to an embodiment of the present disclosure.

FIG. 3 is a schematic block diagram of a CWS according to an embodiment of the present disclosure.

DETAILED DESCRIPTION

Figure 4:
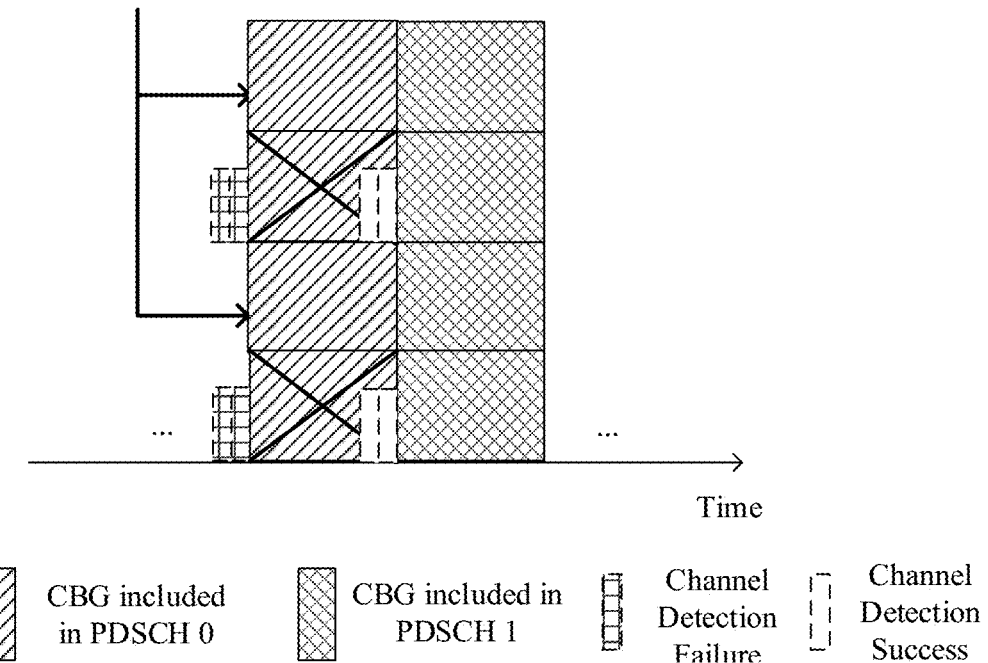
FIG. 4 is another schematic block diagram of a CWS according to an embodiment of the present disclosure.

The technical solutions of the implementations of present disclosure will be described in the following with reference to the accompanying drawings. It is obvious that the implementations to be described are a part rather than all of the implementations of present disclosure. All other implementations obtained by a person of ordinary skill in the art based on the implementations of present disclosure without creative efforts shall fall within the protection scope of present disclosure.

FIG. 1 is a schematic diagram of an application scenario of an embodiment of the present disclosure.

As shown in FIG. 1, a communication system 100 may include a terminal device 110 and a network device 120. The network device 120 may communicate with the terminal device 110 through an air interface. The terminal device 110 and the network device 120 support multi-service transmission.

It should be understood that the embodiments of the present disclosure only uses the communication system 100 for exemplary description, but the embodiments of the present disclosure is not limited thereto. That is, the technical solutions of the embodiments of the present disclosure can be applied to various communication systems, such as: a global system for mobile communications (GSM), a code division multiple access (CDMA) system, a wideband code division multiple access (WCDMA) system, a general packet radio service (GPRS), a long term evolution (LTE) system, an LTE time division duplex (TDD), a universal mobile telecommunications system (UMTS), and a worldwide interoperability for microwave access (WiMAX) communications system, a New Radio (NR) or a future 5G system, etc.

Taking the 5G system as an example, the technical solutions of the embodiments of the present disclosure can be applied to a wide-area long term evolution (LTE) coverage and an NR island coverage mode. Moreover, a large amount of LTE is deployed below 6 GHz, and there is very little spectrum below 6 GHz that can be used for the 5G. As a result, there is a necessity for the NR to study spectrum applications above 6 GHz, but a high frequency band has limited coverage and fast signal fading. In addition, in order to protect mobile operators' early investment in LTE, a tight interworking mode between LTE and NR has been proposed.

Main application scenarios of 5G include: enhance mobile broadband (eMBB), ultra-reliable and low latency communication (URLLC), and massive machine type of communication (mMTC), and eMBB aims at a user to obtain multimedia content, services and data, and its demand is growing rapidly. Because eMBB may be deployed in different scenarios, for example, indoors, urban areas, rural areas, etc., and there are relatively large differences in capabilities and requirements, they cannot be generalized, and can be analyzed in detail in conjunction with specific deployment scenarios. Typical applications of URLLC include: industrial automation, power automation, telemedicine operations (surgery), traffic safety protection, etc. Typical characteristics of mMTC include: high connection density, small data volume, delay-insensitive services, low-cost modules and long service life.

In addition, since complete 5G NR coverage is difficult, network coverage in the embodiments of the present disclosure may adopt wide-area long term evolution (LTE) coverage and NR island coverage mode. In addition, in order to protect mobile operators' early investment in LTE, the tight interworking mode between LTE and NR can be further adopted.

In particular, the technical solutions of the embodiments of the present disclosure can be applied to various communication systems based on non-orthogonal multiple access technologies, for example, a sparse code multiple access (SCMA) system, a low-density signatures (LDS) system, etc. Of course, the SCMA system and LDS system can also be referred to as other names in the communication field; further, the technical solutions of the embodiments of present disclosure can be applied to a multi-carrier transmission system that adopts the non-orthogonal multiple access technologies, such as an orthogonal frequency division multiplexing (OFDM) system that adopts the non-orthogonal multiple access technologies, a filter bank multi-carrier (FBMC) system, a general frequency division multiplexing (GFDM) system, a filtered-OFDM (F-OFDM) system, etc.

In the communication system 100 shown in FIG. 1, the network device 120 may be an access network device that communicates with the terminal device 110. The access network device may provide communication coverage for a particular geographical area, and may communicate with the terminal device 110 (for example, UE) that is located in the coverage.

Optionally, the network device 120 may be a base transceiver station (BTS) in a global system of mobile communication (GSM) system or a code division multiple access (CDMA) system, or may be a NodeB (NB) in a wideband code division multiple access (WCDMA) system, and the network device 120 may also be an evolutional Node B (eNB or eNodeB) in a long term evolution (LTE) system. Optionally, the network device 120 may also be a gNB in a next generation radio access network (NG RAN) or an NR system, or a wireless controller in a cloud radio access network (CRAN), or the access network device may be a relay station, an access point, an in-vehicle device, a wearable device, a concentrator, a switch, a bridge, a router, a network device in a future evolved public land mobile network (PLMN) or the like.

Optionally, the terminal device 110 may be any terminal device, including but not limited to: a device connected by a wired circuit, for example, a public switched telephone network (PSTN), a digital subscriber line (DSL), a digital cable, a direct cable, and/or another data connection/network; and/or a device connected by a wireless interface such as a cellular network, a wireless local area network (WLAN), a digital television network such as a DVB-H network, a satellite network or an AM-FM broadcast transmitter; and/or an device configured to receive/transmit a communication signal in another terminal device; and/or an Internet of Things (IoT) device. The terminal device, which is configured to perform communication via a wireless interface, may be referred to as "a wireless communications terminal", "a wireless terminal" or "a mobile terminal". An example of the mobile terminal includes, but is not limited to, a satellite or cellular phone, a personal communications system (PCS) terminal that may combine a cellular radio telephone with data processing, fax, and data communication capabilities, a personal digital assistant (PDA) that may include a radio phone, a pager, Internet/intranet access, a web browser, a notebook, a calendar, and/or a global positioning system (GPS) receiver or a conventional laptop and/or handheld receiver or another electronic device including a radio phone transceiver. The terminal device may be an access terminal, user equipment (UE), a user unit, a user station, a mobile site, a mobile station, a remote station, a remote terminal, a mobile device, a user terminal, a terminal, a wireless communications device, a user agent or a user device. The access terminal may be a cellular phone, a cordless phone, a session initiation protocol (SIP) phone, a wireless local loop (WLL) station, a PDA, a handheld device having a wireless communications function, a computing device, another processing device connected to a wireless modem, an in-vehicle device, a wearable device, a terminal device in a future 5G network, a terminal device in a future evolved PLMN or the like.

Optionally, the terminal devices 110 may perform device to device (D2D) communication with each other.

FIG. 1 shows one network device and one terminal device as an example. Optionally, the communications system 100 may include a plurality of network devices and there may include other number of terminal devices in the coverage of each network device. This is not limited in the implementation of present disclosure.

Optionally, the communications system 100 may further include other network entities such as a network controller and a mobility management entity. This is not limited in the implementation of present disclosure.

Optionally, an uplink channel in the embodiments of the present disclosure may include a physical random access channel (PRACH), a physical uplink control channel (PUCCH), a physical uplink shared channel (PUSCH) or the like. An uplink reference signal may include an uplink demodulation reference signal (DMRS), a sounding reference signal (SRS), a phase tracking reference signal (PT-RS), etc. The uplink DMRS can be used for uplink channel demodulation, the SRS can be used for uplink channel measurement, uplink time-frequency synchronization or phase tracking, and the PT-RS can also be used for uplink channel measurement, uplink time-frequency synchronization or phase tracking. It should be understood that the embodiments of the present disclosure may include an uplink physical channel or an uplink reference signals with the same names and different functions as the above, and may also include an uplink physical channel or an uplink reference signals with different names and the same functions as the above, this is not limited in the implementation of present disclosure.

It should be understood that a device having a communications function in a network/system in the implementation of present disclosure may be referred to as a communications device. The communications system 100 shown in FIG. 1 is used as an example, the communications device may include a network device 120 and a terminal device 110 that have the communications function. The network device 120 and the terminal device 110 may be a specific device described in the above, and details are not described herein again. The communications device may further include another device, for example, another network entity such as a network controller and an MME in the communications system 100. This is not limited in the implementation of present disclosure.

It should be understood that, terms "system" and "network" in this specification are usually interchangeably used in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

FIG. 2 shows a schematic flowchart of a channel detection method 200 according to an embodiment of the present disclosure, and the method 200 may be executed by a sending device. The sending device shown in FIG. 2 may be the terminal device shown in FIG. 1, and the sending device shown in FIG. 2 may be the access network device shown in FIG. 1. However, the embodiments of the present disclosure are not limited to this.

As shown in FIG. 2, the method 200 includes:
in S210, the sending device determines a CWS for channel detection according to first information, and the first information includes feedback information corresponding to a reference physical channel sent by the sending device on an unlicensed carrier, and the feedback information includes at least one of transmission block-hybrid automatic repeat request (TB-HARQ) acknowledgment information and code block group-hybrid automatic repeat request (CBG-HARQ) information; and in S220, the sending device performs channel detection on the unlicensed carrier according to the CWS.

Specifically, taking the reference physical channel as a physical downlink shared channel (PDSCH) as an example, and taking the sending device as the network device and the receiving device as the terminal device as an example. The network device determines the CWS for channel detection according to the first information. For example, the network device may count the first information, and determine whether to increase a window size according to whether the first information meets a certain condition. That is, the network device needs to maintain and adjust the CWS before starting channel access on the unlicensed carrier.

Optionally, the network device can maintain and adjust the CWS according to the following steps:
in step 1, assuming that a channel access priority class is p∈{1, 2, 3, 4}, the network device may determine the smallest window size among the multiple window sizes as the current window size in the multiple window sizes corresponding to the channel access priority class, that is, $CW_p = CW_{min,p}$, For example, when the channel access priority class P=1, the corresponding multiple window sizes can be {3, 7}, where a number in {3, 7} can indicate the number of TBs or CBGs included in the window size; and for another example, when the channel access priority class P=2, the corresponding multiple window sizes can be {7, 15}; for another example, when the channel access priority class P=3, the corresponding multiple window sizes can be {15, 31, 63}; for another example, when the channel access priority class P=4, the corresponding multiple window sizes can be {15, 31, 63, 127, 255, 511, 1023};

in step 2, the network device increases the window size to a next larger value corresponding to the priority when determining to increase the window size according to the first information.

It should be understood that the numbers involved in the above steps 1 and 2 are only an example, and the embodiments of the present disclosure are not limited to this.

Further, if the current window size of the network device has reached the maximum value, the window size after the step 2 is executed (that is, after the window size is increased) is still the maximum value. Optionally, in the embodiments of the present disclosure, after the maximum window size is maintained for K times, the network device may reset the window size to the minimum value, where K is a number determined from {1, 2, 3, 4, 5, 6, 7, 8} according to the priority.

In the embodiments of present disclosure, the HARQ-ACK feedback corresponding to the reference physical channel sent by the sending device on the unlicensed carrier can be fed back in the form of CBG feedback, and the sending device can maintain and adjust the CWS based on at least one of the TB-HARQ acknowledgment information and the CBG-HARQ acknowledgment information of the reference physical channel, thereby effectively improving efficiency of maintaining and adjusting the CWS.

For example, if the sending device fails to transmit the CBG corresponding to the reference physical channel due to the failure of channel preemption, the receiving device still needs to feed back the HARQ-ACK information corresponding to the CBG. FIG. 3 and FIG. 4 respectively show a case where information corresponding to a part of the CBG in one PDSCH in time domain and frequency domain is not transmitted. As shown in FIG. 3, for the first CBG included in PDSCH 0, due to the failure of channel preemption, the CBG corresponding to the reference physical channel is not transmitted. As shown in FIG. 4, for two CBGs included in PDSCH 0, due to the failure of channel preemption, the CBG corresponding to the reference physical channel is not transmitted. It can be found that the HARQ-ACK information corresponding to the CBG that has not been transmitted does not actually reflect the occupancy of a downlink channel. The technical solution of the embodiments of the present disclosure can prevent the HARQ-ACK information corresponding to the CBG that is not transmitted from being used, thereby effectively improving efficiency of maintaining and adjusting the CWS.

Optionally, in some embodiments of the present disclosure, at least part of time resources in transmission resources of the reference physical channel is located in a reference time unit.

Optionally, one reference time unit is used for adjusting the window size once.

Optionally, the reference time unit is a first length of time after a starting time of the most recent downlink transmission performed by the network device on the carrier, and the network device has acquired at least part of the HARQ acknowledgment information on the reference time unit.

Optionally, the reference time unit may be some specific time units. For example, taking the reference physical channel being the PDSCH as an example, it is assumed that the PDSCH is transmitted through two slots, that is, slot n and slot n+1. Optionally, slot n is the reference time unit, and slot n+1 is not a reference time unit.

Optionally, in some embodiments of the present disclosure, the reference time unit includes a first time unit or first two time units in a latest transmission performed by the sending device on the unlicensed carrier before determining the CWS by the sending device.

Optionally, in some embodiments of the present disclosure, the latest transmission may be the most recent transmission opportunity. Optionally, one transmission opportunity may be a downlink transmission opportunity or an uplink transmission opportunity. One downlink transmission opportunity may include time units continuously transmitted by the network device. One uplink transmission opportunity may include time units continuously transmitted by the terminal device. A channel occupation duration may include the downlink transmission opportunity and/or the uplink transmission opportunity.

Optionally, in some embodiments of the present disclosure, one time unit can be one or more sub-frames, or one or more slots, or one or more symbols, or one or more mini slots and so on. In other words, a start time unit and/or an end time unit of one downlink transmission opportunity (or one uplink transmission opportunity, or the channel occupation duration) may be a complete time unit or a partial time unit. The embodiments of present disclosure do not specifically limit this.

In the embodiments of the present disclosure, taking one time unit as one time slot as an example, the reference time unit may include a first complete slot or first two complete slots in a latest transmission opportunity performed by the sending device on the unlicensed carrier before determining the CWS by the sending device.

Optionally, in some embodiments of the present disclosure, the reference time unit includes a first sub-frame or first two sub-frames in a latest transmission performed by the sending device on the unlicensed carrier before determining the CWS by the sending device.

Optionally, in some embodiments of the present disclosure, a duration of one sub-frame may be 1 ms. One slot can include 14 symbols. Optionally, one sub-frame may include at least one slot. For example, when a subcarrier interval is 15 kHz, one sub-frame includes one slot; for another example, when the subcarrier interval is 30 kHz, one sub-frame includes two time slots; for still another example, when the subcarrier interval is 60 kHz, one sub-frame includes four time slots.

In the embodiments of the present disclosure, a case where the reference time unit includes the first sub-frame in the latest transmission performed by the sending device on the unlicensed carrier before determining the CWS by the sending device is taken as an example. When the subcarrier interval is 15 kHz, the reference time unit includes the first complete slot in the latest transmission opportunity performed by the sending device on the unlicensed carrier before determining the CWS by the sending device. When the subcarrier interval is 30 kHz, the reference time unit includes the first two complete slots in the latest transmission opportunity performed by the sending device on the unlicensed carrier before determining the CWS by the sending device. When the subcarrier interval is 60 kHz, the reference time unit includes the first four complete slots in the latest transmission opportunity performed by the sending device on the unlicensed carrier before determining the CWS by the sending device.

It should be understood that the reference time unit in the embodiments of the present disclosure including the first time unit or the first two time units in the latest transmission performed by the sending device on the unlicensed carrier before determining the CWS by the sending device is only an example, and the embodiments of the present disclosure is not limited thereto.

For example, in other alternative embodiments, the reference time unit includes: a first time unit or first two time units in a second-to-last transmission performed by the sending device on the unlicensed carrier before determining the CWS by the sending device.

Assuming that the physical reference channel is the PDSCH. In the embodiments of the present disclosure, the sending device is the network device, and the receiving device is the terminal device, that is, the network device sends the PDSCH to the terminal device. Since it takes time for the terminal device to send the HARQ information corresponding to the PDSCH to the network device after receiving the PDSCH, it is possible that the network device has not obtained the HARQ information of the PDSCH on the first sub-frame or the first two sub-frames (or time units) in the latest transmission when determining the CWS. In this case, the network device may adjust the CWS according to the HARQ information of the PDSCH on the first sub-frame or the first two sub-frames (or time units) in the second-to-last transmission.

The following describes specific content that may be included in the first information in the embodiments of the present disclosure.

Taking the reference physical channel being the PDSCH as an example, optionally, when one PDSCH occupies multiple slots and some resources in the multiple slots belong to the reference time unit, if the feedback corresponding to the PDSCH is the HARQ-ACK information feedback based on the TB, the HARQ-ACK information corresponding to the TB is used for adjusting the CWS window, and the first information may include the HARQ-ACK information corresponding to the TB. Optionally, when one PDSCH occupies multiple slots and some resources in the multiple slots belong to the reference time unit, if the feedback corresponding to the PDSCH is the HARQ-ACK information feedback based on the CBG, the HARQ-ACK information corresponding to the CBG transmitted on the reference time unit is used for adjusting the CWS window, that is, the first information may include the HARQ-ACK information corresponding to the CBG transmitted on the reference time unit.

Optionally, in some embodiments of the present disclosure, when the reference physical channel sent by the sending device on the unlicensed carrier does not include a first CBG, the first information does not include first CBG-HARQ information corresponding to the first CBG. In other words, when the reference physical channel sent by the sending device on the unlicensed carrier does not include the first CBG, the first CBG-HARQ information corresponding to the first CBG is not used for determining the CWS.

Optionally, in some embodiments of the present disclosure, when the reference physical channel sent by the sending device on the unlicensed carrier does not include a first CBG, the first information includes first CBG-HARQ information corresponding to the first CBG. In other words, when the reference physical channel sent by the sending device on the unlicensed carrier does not include a first CBG, the first CBG-HARQ information corresponding to the first CBG may be used for determining the CWS.

Optionally, the sending device may virtualize the first CBG-HARQ information as the HARQ-ACK information of the TB.

For example, in multiple pieces of CBG feedback information corresponding to one TB, when all the CBG feedback information is ACK, the virtual TB feedback information is ACK; otherwise, the virtual TB feedback information is NACK; or, the virtual TB feedback information is determined to be ACK (or NACK) according to the percentage of the ACK (or NACK) information in the CBG feedback information.

For another example, the sending device may use the feedback information corresponding to each CBG as one piece of independent HARQ-ACK information for calculating the percentage of NACK information in the HARQ-ACK information, so as to determine whether to increase the window size according to whether the percentage reaches or exceeds a preset threshold value. That is, whether the percentage of NACK information in the HARQ-ACK information reaches or exceeds the preset threshold is used to determine whether to increase the window size. For example, when the percentage of NACK information in the HARQ-ACK information is greater than a preset threshold, it is determined to increase the window size. Optionally, the preset threshold is 80%.

Optionally, in some embodiments of the present disclosure, a resource assigned to the reference physical channel in frequency domain is a resource in a first bandwidth part (BWP); the sending device performs the channel detection on a second BWP on the unlicensed carrier according to the CWS.

Optionally, in some embodiments of the present disclosure, positions of the first BWP and the second BWP in the frequency domain are same, and in the process of performing the channel detection on the second BWP, the first BWP may include the HARQ-ACK information corresponding to the physical reference channel transmitted on the first BWP. Specifically, the first information may include at least one of TB-HARQ information and CBG-HARQ information corresponding to the reference physical channel.

For example, during a broadband LBT, if the last transmission was a broadband-based transmission, the HARQ-ACK information used for CWS window adjustment includes the HARQ-ACK information corresponding to the PDSCH transmitted on the corresponding broadband.

For another example, during a sub-band LBT, if the last transmission was a sub-band-based transmission, the HARQ-ACK information used for CWS window adjustment includes the HARQ-ACK information corresponding to the PDSCH transmitted on the corresponding sub-band.

Optionally, in some embodiments of the present disclosure, the first BWP is a subset of the second BWP, and the first information includes at least one of TB-HARQ information and CBG-HARQ information corresponding to the reference physical channel. In other words, during the broadband LBT, if the last transmission was sub-band-based transmission, and the corresponding feedback includes CBG-based feedback and/or TB feedback, the HARQ-ACK information used for CWS window adjustment includes at least one of the TB-HARQ information and the CBG-HARQ information corresponding to the reference physical channel transmitted by the sending device on the sub-band.

Optionally, in some embodiments of the present disclosure, the second BWP is a subset of the first BWP, and the first information does not include TB-HARQ information corresponding to the reference physical channel. In other words, during the sub-band LBT, if the last transmission is the broadband-based transmission, and the corresponding feedback includes TB-based feedback, the HARQ-ACK information used for CWS window adjustment does not include the HARQ-ACK information corresponding to the TB transmitted on the corresponding broadband.

Optionally, in some embodiments of the present disclosure, the second BWP is a subset of the first BWP, and the first information includes CBG-HARQ information corresponding to a CBG transmitted on the second BWP by the reference physical channel. In other words, during the sub-band LBT, if the last transmission was broadband-based transmission and the corresponding feedback includes CBG-based feedback, the HARQ-ACK information used for CWS window adjustment includes the HARQ-ACK information corresponding to the CBG transmitted on the corresponding sub-band.

Optionally, during the sub-band LBT, if the last transmission is sub-band-based transmission, the HARQ-ACK information used for CWS window adjustment includes the HARQ-ACK information corresponding to the TB or CBG the most recent transmitted on the sub-band, that is, the first information may include the HARQ-ACK information corresponding to the TB or CBG the most recent transmitted on the sub-band.

Optionally, during the sub-band LBT, if the last transmission was broadband-based transmission, and the corresponding feedback includes the TB-based feedback, the HARQ-ACK information used for CWS window adjustment includes the HARQ-ACK information corresponding to the TB the most recent transmitted on the sub-band.

Optionally, during the sub-band LBT, if the last transmission was broadband-based transmission, and the corresponding feedback includes the TB-based feedback, the HARQ-ACK information used for CWS window adjustment includes the HARQ-ACK information corresponding to TB transmitted on the broadband. That is, the first information may include HARQ-ACK information corresponding to the TB transmitted on the broadband.

Specifically, taking the physical reference channel being the PDSCH as an example, if the percentage of NACK included in the HARQ-ACK corresponding to the PDSCH transmission is greater than or equal to the first preset value (or if the number of NACK included in the HARQ-ACK corresponding to the PDSCH transmission is greater than or equal to the second preset value), the length of the competition window is increased, otherwise, the length of the competition window is set to an initial value or decreased or remains unchanged.

Optionally, an increase in the length of the competition window may be a linear increase or an exponential increase. Optionally, a decrease in the length of the contention window may be linearly increase or an exponential decrease. Optionally, the first preset value is 80%.

It should be understood that the embodiments of the present disclosure may be used for the downlink channel access (for example, the network device performs the channel access), and may also be used for the uplink channel access (for example, the terminal device performs the channel access).

Optionally, in some embodiments of present disclosure, the embodiments of present disclosure can be used for the downlink channel access, that is, the sending device is the network device, a receiving device is the terminal device, and the reference physical channel is the physical downlink shared channel (PDSCH).

Specifically, the network device determines the CWS for channel detection according to the first information, and the first information includes the feedback information corresponding to the PDSCH sent by the network device on the unlicensed carrier, and the feedback information includes at least one of the TB-HARQ information and the CBG-HARQ information.

Optionally, in some embodiments of present disclosure, the embodiments of present disclosure can be used for the uplink channel access, that is, the sending device is the terminal device, the receiving device is the network device, and the reference physical channel is a physical shared channel (PUSCH).

Specifically, the terminal device determines the CWS for channel detection according to the first information, and the first information includes the feedback information corresponding to the PUSCH sent by the terminal device on the unlicensed carrier, and the feedback information includes at least one of the TB-HARQ information and the CBG-HARQ information.

It should be understood that, in the embodiments of present disclosure, the feedback information including at least one of the TB-HARQ acknowledgment information and the CBG-HARQ information is only an example, but the embodiments of present disclosure do not limit the specific forms of the feedback information.

For example, the feedback information may be embodied by new data indicator (NDI) information. Specifically, the first information includes the new data indicator (NDI) information, and the NDI information is determined according to at least one of the TB-HARQ information and the CBG-HARQ information. For example, the NDI information is used for indicating whether each TB is a new transmission or a retransmission. Further, if the corresponding feedback information includes the CBG-HARQ information. Optionally, when all the CBG-HARQ information included in one TB in the PDSCH is ACK, the NDI information is used for indicating that the TB is the new transmission; otherwise (that is, when at least one piece of all the CBG-HARQ information included in the TB is NACK), the NDI information is used for indicating that the TB is the retransmission. However, the embodiments of the present disclosure are not limited to this. For example, in other alternative embodiments, the NDI information is used for indicating whether each CBG is the new transmission or the retransmission. That is, when the CBG-HARQ information in the PDSCH is ACK, the NDI information is used for indicating that the CBG is the new transmission; when the CBG-HARQ information in the PDSCH is NACK, the NDI information is used for indicating that the CBG is the retransmission.

Optionally, one TB or two TBs can be transmitted in one PDSCH.

The preferred embodiments of the present disclosure are described in detail above with reference to the accompanying drawings. However, the present disclosure is not limited to the specific details in the above-mentioned embodiments. Within the scope of the technical concept of the present disclosure, various simple modifications can be made to the technical solutions of the present disclosure. These simple variants all belong to the protection scope of present disclosure.

For example, the various specific technical features described in the above specific embodiments can be combined in any suitable manner without contradiction. In order to avoid unnecessary repetition, present disclosure will not further explain various possible combinations.

For another example, various different implementations of present disclosure can also be combined arbitrarily, as long as they do not violate the idea of present disclosure, they should also be regarded as the content disclosed in present disclosure.

It should be understood that in the various method embodiments of the present disclosure, the sequence numbers of the processes do not mean an execution order. The execution order of individual processes should be determined by its function and internal logic, and should not constitute any limitation to the implementation process of the embodiments of present disclosure.

Figure 5:
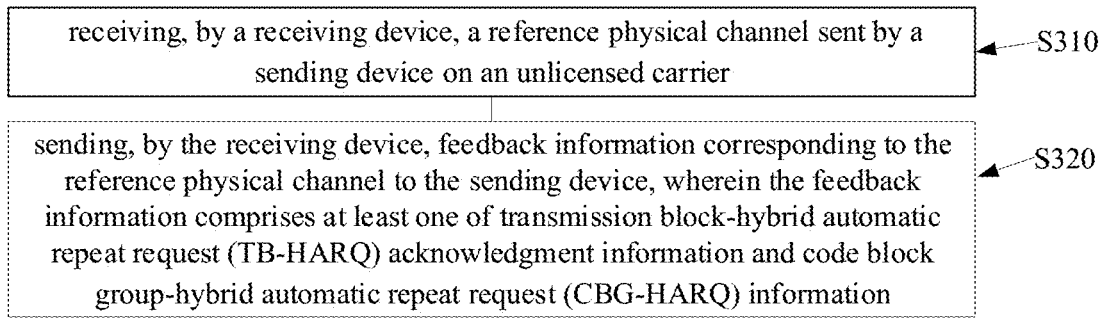
FIG. 5 is a schematic flowchart of an information reception method according to an embodiment of the present disclosure.

The foregoing describes in detail the channel detection method according to the embodiments of the present disclosure from the perspective of the sending device in conjunction with FIGS. 2 to 4, and the following will describe an information reception method according to the embodiments of the present disclosure from the perspective of the receiving device in conjunction with FIG. 5.

FIG. 5 is a schematic flowchart of an information reception method according to an embodiment of the present disclosure. The method 200 may be executed by the sending device. The sending device shown in FIG. 5 may be the terminal device shown in FIG. 1, and the sending device shown in FIG. 5 may be the access network device shown in FIG. 1. However, the embodiments of the present disclosure are not limited to this.

As shown in FIG. 5, the method 300 includes:

in S310, the receiving device receives the reference physical channel sent by the sending device on the unlicensed carrier.

in S310, the receiving device sends feedback information corresponding to the reference physical channel to the sending device, and the feedback information includes at least one of transmission block-hybrid automatic repeat request (TB-HARQ) acknowledgment information and code block group-hybrid automatic repeat request (CBG-HARQ) information.

Optionally, in some embodiments of the present disclosure, at least part of time resources in transmission resources of the reference physical channel is located in a reference time unit.

Optionally, in some embodiments of the present disclosure, the reference time unit includes:

a first time unit or first two time units in one transmission performed by the receiving device on the unlicensed carrier.

Optionally, in some embodiments of the present disclosure, the reference time unit includes:

a first sub-frame or first two sub-frames in one transmission performed by the receiving device on the unlicensed carrier.

Optionally, in some embodiments of the present disclosure, when the reference physical channel received by the receiving device on the unlicensed carrier does not include a first CBG, the feedback information includes first CBG-HARQ information corresponding to the first CBG.

Optionally, in some embodiments of the present disclosure, the first CBG-HARQ information is negative acknowledgment (NACK) information.

Optionally, in some embodiments of the present disclosure, the receiving device receives the reference physical channel sent by the sending device on the first bandwidth part (BWP).

Optionally, in some embodiments of the present disclosure, the receiving device is the terminal device, the sending device is the network device, and the reference physical channel is the physical downlink shared channel (PDSCH).

Optionally, in some embodiments of the present disclosure, the receiving device is the network device, the sending device is the terminal device, and the reference physical channel is a physical shared channel (PUSCH).

It should be understood that the steps in the method 300 for the receiving device to receive the information can refer to the corresponding steps in the method 200 for the sending device to detect the channel. For brevity, details are not repeated here.

The method embodiments of the present disclosure are described in detail above with reference to FIGS. 1 to 5, and the device embodiments of the present disclosure are described in detail below with reference to FIGS. 6 to 9.

Figure 6:
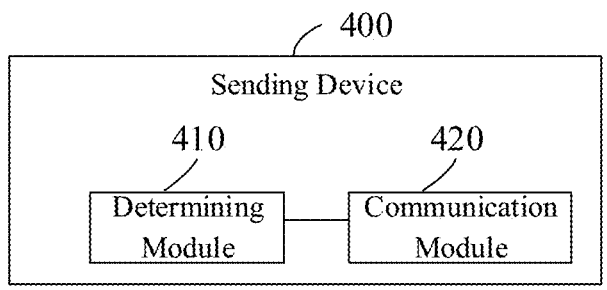
FIG. 6 is a schematic block diagram of a sending device according to an embodiment of the present disclosure.

FIG. 6 is a schematic block diagram of a sending device 400 according to an embodiment of the present disclosure.

Specifically, as shown in FIG. 6, the sending device 400 may include:

a determining module 410, configured to determine a contention window size (CWS) for channel detection according to first information, wherein the first information includes feedback information corresponding to a reference physical channel sent by the sending device on an unlicensed carrier, and the feedback information includes at least one of transmission block-hybrid automatic repeat request (TB-HARQ) acknowledgment information and code block group-hybrid automatic repeat request (CBG-HARQ) information; and a communication module 420, configured to perform channel detection on the unlicensed carrier according to the CWS.

Optionally, in some embodiments of the present disclosure, at least part of time resources in transmission resources of the reference physical channel is located in a reference time unit.

Optionally, in some embodiments of the present disclosure, the reference time unit includes:

a first time unit or first two time units in a latest transmission performed by the sending device on the unlicensed carrier before determining the CWS by the sending device.

Optionally, in some embodiments of the present disclosure, the reference time unit includes:

a first sub-frame or first two sub-frames in a latest transmission performed by the sending device on the unlicensed carrier before determining the CWS by the sending device.

Optionally, in some embodiments of the present disclosure, when the reference physical channel sent by the sending device on the unlicensed carrier does not include a first CBG, the first information does not include first CBG-HARQ information corresponding to the first CBG.

Optionally, in some embodiments of the present disclosure, when the reference physical channel sent by the sending device on the unlicensed carrier does not include a first CBG, the first information includes first CBG-HARQ information corresponding to the first CBG.

Optionally, in some embodiments of the present disclosure, a resource assigned to the reference physical channel in frequency domain is a resource in a first bandwidth part (BWP); wherein, the communication module 420 is specifically configured to:

perform the channel detection on a second BWP on the unlicensed carrier according to the CWS.

Optionally, in some embodiments of the present disclosure, the first BWP is a subset of the second BWP, and the first information includes at least one of TB-HARQ information and CBG-HARQ information corresponding to the reference physical channel.

Optionally, in some embodiments of the present disclosure, the second BWP is a subset of the first BWP, and the first information does not include TB-HARQ information corresponding to the reference physical channel.

Optionally, in some embodiments of the present disclosure, the second BWP is a subset of the first BWP, and the first information includes CBG-HARQ information corresponding to a CBG transmitted on the second BWP by the reference physical channel.

Optionally, in some embodiments of the present disclosure, the sending device is a network device, and the reference physical channel is a physical downlink shared channel (PDSCH).

Optionally, in some embodiments of the present disclosure, the sending device is a terminal device, and the reference physical channel is a physical shared channel (PUSCH).

It should be understood that the device embodiments and the method embodiments may correspond to each other, and similar descriptions may refer to the method embodiments. Specifically, the sending device 400 shown in FIG. 6 may correspond to a corresponding subject that executes the method 200 in the embodiments of the present disclosure, and the foregoing and other operations and/or functions of individual units in the sending device 400 are configured to implement the corresponding procedures in individual methods in FIG. 2 respectively. For brevity, they will not be repeated here.

Figure 7:
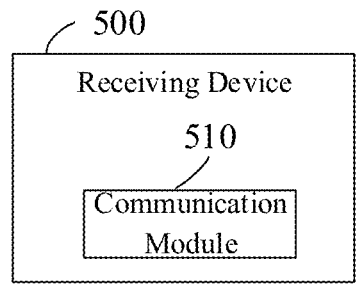
FIG. 7 is a schematic block diagram of a receiving device according to an embodiment of the present disclosure.

FIG. 7 is a schematic block diagram of a receiving device 500 according to an embodiment of the present disclosure.

As shown in FIG. 7, the receiving device 500 may include a communication module 510;

the communication module 510 is configured to:

receive a reference physical channel sent by a sending device on an unlicensed carrier; and send feedback information corresponding to the reference physical channel to the sending device, wherein the feedback information includes at least one of transmission block-hybrid automatic repeat request (TB-HARQ) acknowledgment information and code block group-hybrid automatic repeat request (CBG-HARQ) information.

Optionally, in some embodiments of the present disclosure, at least part of time resources in transmission resources of the reference physical channel is located in a reference time unit.

Optionally, in some embodiments of the present disclosure, the reference time unit includes:

a first time unit or first two time units in one transmission performed by the receiving device on the unlicensed carrier.

Optionally, in some embodiments of the present disclosure, the reference time unit includes:

a first sub-frame or first two sub-frames in one transmission performed by the receiving device on the unlicensed carrier.

Optionally, in some embodiments of the present disclosure, when the reference physical channel received by the receiving device on the unlicensed carrier does not include a first CBG, the feedback information includes first CBG-HARQ information corresponding to the first CBG.

Optionally, in some embodiments of the present disclosure, the first CBG-HARQ information is negative acknowledgment (NACK) information.

Optionally, in some embodiments of the present disclosure, the communication module 510 is specifically configured to:

receive the reference physical channel sent by the sending device on a first bandwidth part (BWP).

Optionally, in some embodiments of the present disclosure, the receiving device is a terminal device, and the reference physical channel is a physical downlink shared channel (PDSCH).

Optionally, in some embodiments of the present disclosure, the receiving device is a network device, and the reference physical channel is a physical shared channel (PUSCH).

It should be understood that the device embodiments and the method embodiments may correspond to each other, and similar descriptions may refer to the method embodiments. Specifically, the receiving device 500 shown in FIG. 7 may correspond to a corresponding subject that executes the method 300 in the embodiments of the present disclosure, and the foregoing and other operations and/or functions of individual units in the receiving device 500 are configured to implement the corresponding procedures in individual methods in FIG. 5 respectively. For brevity, they will not be repeated here.

The communication device of the embodiments of the present disclosure is described above from a perspective of functional modules with reference to FIGS. 6 and 7. It should be understood that the functional modules can be implemented in the form of hardware, can also be implemented in the form of software instructions, or can be implemented in a combination of hardware and software modules.

Specifically, the steps of the method embodiments in the embodiments of the present disclosure can be completed by the integrated logic circuit of the hardware in the processor and/or the instructions in the form of software, and the steps of the method disclosed in the embodiments of the present disclosure can be directly embodied to be completed by the execution of a hardware decoding processor, or a combination of hardware and software modules in the decoding processor.

Optionally, the software module may be located in a mature storage medium in the field, such as a random access memory, a flash memory, a read only memory, a programmable read only memory, an electrically erasable programmable memory, a register, etc. The storage medium is located in the memory, and the processor reads information in the memory, and completes the steps in the method embodiments in combination with its hardware.

For example, in the embodiments of the present disclosure, the determining module 410 shown in FIG. 6 may be implemented by a processor, and the communication module 420 shown in FIG. 6 and the communication module 510 shown in FIG. 7 may be implemented by a transceiver.

Figure 8:
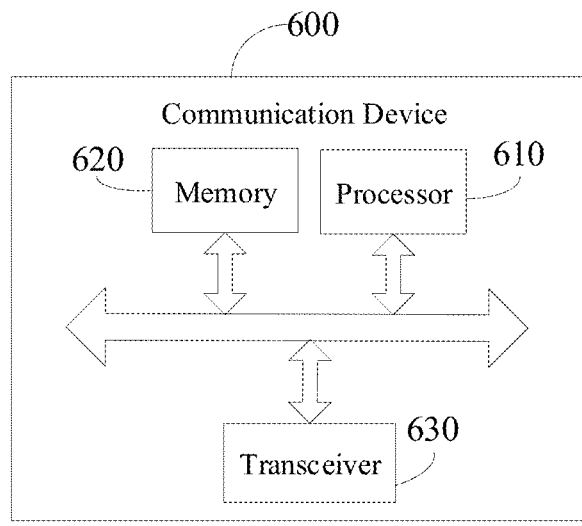
FIG. 8 is a schematic block diagram of a communication device according to an embodiment of the present disclosure.

FIG. 8 is a schematic structural diagram of a communication device 600 according to an embodiment of the present disclosure. The communication device 600 shown in FIG. 8 includes a processor 610, and the processor 610 can call and run a computer program from a memory to implement the method in the embodiments of the present disclosure.

Optionally, as shown in FIG. 8, the communication device 600 may further include a memory 620. The memory 620 may be configured to store instruction information, and may also be configured to store codes and instructions executed by the processor 610. The processor 610 may call and run a computer program from the memory 620 to implement the method in the embodiments of the present disclosure.

The memory 620 may be a component independent of the processor 610, or may be integrated into the processor 610.

Optionally, as shown in FIG. 8, the communications device 600 may further include a transceiver 630. The processor 610 may control the transceiver 630 to communicate with another device. Specifically, the transceiver 630 may send information or data to the another device, or receive information or data sent by the another device.

The transceiver 630 may include a transmitter and a receiver. The transceiver 630 may further include an antenna, and there may be one or more of antennas.

Optionally, the communications device 600 may be the sending device in the implementations of present disclosure, and the communications device 600 may implement corresponding procedures implemented by the sending device in various methods in the implementations of present disclosure. That is, the communication device 600 in the embodiments of the present disclosure may correspond to the sending device 400 in the embodiments of the present disclosure, and may correspond to the corresponding subject that executes the method 200 according to the embodiments of the present disclosure. For brevity, details are not described herein again.

Optionally, the communications device 600 may be specifically a mobile terminal/terminal device in the implementations of present disclosure, and the communications device may implement corresponding procedures implemented by the mobile terminal/terminal device in various methods in the implementations of present disclosure. that is, the communication device 600 may correspond to the receiving device 500 in the embodiments of the present disclosure, and may correspond to a corresponding subject that executes the method 300 according to the embodiments of the present disclosure. For brevity, details are not described herein again.

It should be understood that the various components in the communication device 600 are connected by a bus system, in addition to a data bus, the bus system also includes a power bus, a control bus, and a status signal bus.

In addition, the embodiments of the present disclosure also provides a chip, which may be an integrated circuit chip with signal processing capabilities, and can implement or execute the methods, steps, and logic block diagrams disclosed in the embodiments of the present disclosure.

Optionally, the chip can be applied to various communication devices, so that the communication device installed with the chip can execute the methods, steps, and logical block diagrams disclosed in the embodiments of the present disclosure.

Figure 9:
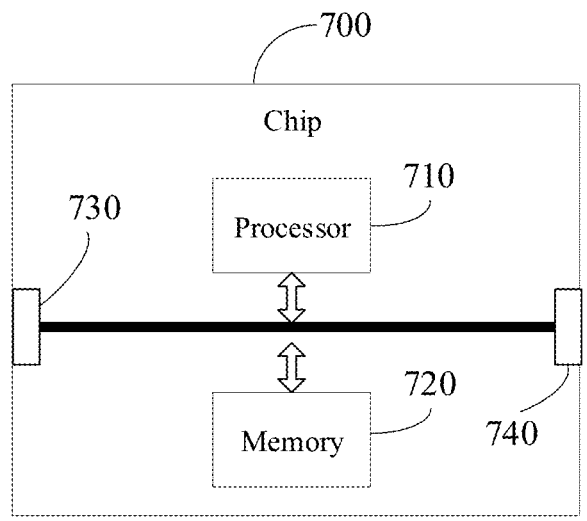
FIG. 9 is a schematic block diagram of a chip according to an embodiment of the present disclosure.

FIG. 9 is a schematic structural diagram of a chip according to an embodiment of the present disclosure.

The chip 700 shown in FIG. 9 includes a processor 710. The processor 710 may invoke a computer program from a memory and run the computer program, to implement the method in the implementations of present disclosure.

Optionally, as shown in FIG. 9, the chip 700 may further include a memory 720. The processor 710 may invoke the computer program from the memory 720 and run the computer program, to implement the method in the implementations of present disclosure. The memory 720 may be configured to store instruction information, and may also be configured to store codes and instructions executed by the processor 710.

The memory 720 may be a component independent of the processor 710, or may be integrated into the processor 710.

Optionally, the chip 700 may further include an input interface 730. The processor 710 may control the input interface 730 to communicate with another device or chip. Specifically, the input interface 730 may obtain information or data sent by the another device or chip.

Optionally, the chip 700 may further include an output interface 740. The processor 710 may control the output interface 740 to communicate with another device or chip. Specifically, the output interface 740 may output information or data to the another device or chip.

Optionally, the chip may be applied to the network device in the implementations of present disclosure, and the chip may implement corresponding procedures implemented by the network device in various methods in the implementations of present disclosure. For brevity, details are not described herein again.

Optionally, the chip may be applied to the terminal device in the implementations of present disclosure, and the chip can implement corresponding procedures implemented by the terminal device in various methods in the implementations of present disclosure. For brevity, details are not described herein again.

It should be noted that, the chip mentioned in the implementations of present disclosure may also be referred to as a system-level chip, a system chip, a chip system, a system on chip or the like. It should also be understood that the various components in the chip 700 are connected by a bus system, and in addition to a data bus, the bus system also includes a power bus, a control bus, and a status signal bus.

The processors mentioned in the embodiments of present disclosure may be general purpose processors, digital signal processors (DSPs), application specific integrated circuits (ASICs), field programmable gate arrays (FPGAs) or other programmable logic devices, discrete gates or transistor logic devices, discrete hardware components, and so on. The general purpose processor may be a microprocessor can also be any conventional processor, and so on.

In addition, the memory mentioned in the embodiment of the present disclosure may be a volatile memory or a nonvolatile memory, or may include a volatile memory and a nonvolatile memory. The non-volatile memory may be a read-only memory (ROM), a programmable read-only memory (PROM), an erasable PROM (EPROM), an electrically EPROM (EEPROM) or a flash memory. The volatile memory may be a random access memory (RAM), and is used as an external cache.

It should be understood that, the memory is an example but is not intended for limitation. For example, the memory in the embodiments of the present disclosure may alternatively be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM), a direct rambus RAM (DR RAM), and the like.

An embodiment of the present disclosure further provides a computer readable storage medium. The computer readable storage medium is configured to store a computer program.

Optionally, the computer readable storage medium may be applied to the network device in the embodiments of the present disclosure, and the computer program enables a computer to execute a corresponding procedure implemented by the network device in the methods of the embodiments of the present disclosure. For brevity, details are not described herein again.

Optionally, the computer readable storage medium may be applied to the mobile terminal/terminal device in the embodiments of the present disclosure, and the computer program enables the computer to execute a corresponding procedure implemented by the mobile terminal/terminal device in the methods of the embodiments of the present disclosure. For brevity, details are not described herein again.

The present disclosure further provides a computer program product. The computer program product includes a computer program instruction.

Optionally, the computer program product may be applied to the network device in the embodiments of the present disclosure, and the computer program instruction enables the computer to execute a corresponding procedure implemented by the network device in the methods of the embodiments of the present disclosure. For brevity, details are not described herein again.

Optionally, the computer program product may be applied to the mobile terminal/terminal device in the embodiments of the present disclosure, and the computer program instruction enables the computer to execute a corresponding procedure implemented by the mobile terminal/terminal device in the methods of the embodiments of the present disclosure. For brevity, details are not described herein again.

An embodiment of the application also provides a computer program.

Optionally, the computer program may be applied to the network device in the embodiments of the present disclosure, and when run on a computer, the computer program instruction enables the computer to execute a corresponding procedure implemented by the network device in the methods of the embodiments of the present disclosure. For brevity, details are not described herein again.

An embodiment of the present disclosure also provides a communication system, and the communication system may include a sending device and a receiving device. The sending device may be configured to implement the corresponding functions implemented by the sending device in the above method 200, and the composition of the sending device may be as shown in the sending device 400 in FIG. 6. For brevity, details are not repeated here. The receiving device may be configured to implement the corresponding functions implemented by the receiving device in the foregoing method 300, and the composition of the receiving device may be as shown in the network device 500 in FIG. 7, which is not repeated here for brevity.

It should be noted that the term "system" herein can also be referred to as "network management architecture" or "network system".

It should also be understood that the terms used in the embodiments of the present disclosure and the appended claims are only for the purpose of describing specific embodiments, and are not intended to limit the embodiments of the present disclosure.

For example, the singular forms of "a", "said", "above" and "the" used in the embodiments of present disclosure and the appended claims are also intended to include plural forms, unless the context clearly indicates other meanings.

Those of ordinary skill in the art will appreciate that the exemplary units and algorithm steps described according to the embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

The functions may be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a read-only memory, a random access memory, a magnetic disk or an optical disk, and the like.

A person skilled in the art may clearly understand that, for simple and clear description, for specific work processes of the foregoing described system, device, and unit, reference may be made to corresponding process in the foregoing method implementations, and details are not described herein again.

In the several embodiments provided in present disclosure, it should be understood that the disclosed system, device, and method may be implemented in other ways.

For example, the division of the units or modules or components in the device embodiments described above is only a kind of logical function division. In practice, other division manner may be used. For example, multiple units or modules or components may be combined or integrated into another system, or some units or modules or components may be ignored or not performed.

For another example, the above units/modules/components described as separate/display components may or may not be physically separated, that is, they may be located in one place, or may be distributed over multiple network units. Some or all of the units/modules/components may be selected according to actual needs to achieve the objectives of the solutions in the embodiments.

Finally, it should be noted that the illustrated or discussed mutual coupling or direct coupling or communication connection between each other may be indirect coupling or communication connection through some interfaces, devices or units, and may be in electrical, mechanical or other forms.

The foregoing descriptions are merely specific implementations of the embodiments of present disclosure, but are not intended to limit the protection scope of the embodiments of present disclosure. Any variation or replacement readily figured out by a person skilled in the art within the technical scope disclosed in the embodiments of present disclosure shall fall within the protection scope of the embodiments of present disclosure. Therefore, the protection scope of the embodiments of present disclosure shall be subject to the protection scope of the claims.

What is claimed is:

1. A channel detection method, comprising:
determining, by a sending device, a contention window size (CWS) for channel detection according to first information, wherein the first information comprises feedback information corresponding to a reference physical channel sent by the sending device on an unlicensed carrier, and the feedback information comprises at least one of transmission block-hybrid automatic repeat request (TB-HARQ) acknowledgment information and code block group-hybrid automatic repeat request (CBG-HARQ) information; and
performing, by the sending device, channel detection on the unlicensed carrier according to the CWS;
wherein a resource assigned to the reference physical channel in frequency domain is a resource in a first bandwidth part (BWP); wherein, the performing, by the sending device, the channel detection on the unlicensed carrier according to the CWS comprises:
performing, by the sending device, the channel detection on a second BWP on the unlicensed carrier according to the CWS.

2. The method according to claim 1, wherein at least part of time resources in transmission resources of the reference physical channel is located in a reference time unit.

3. The method according to claim 2, wherein the reference time unit comprises one of the following:

a first time unit or first two time units in a latest transmission performed by the sending device on the unlicensed carrier before determining the CWS by the sending device; and a first sub-frame or first two sub-frames in a latest transmission performed by the sending device on the unlicensed carrier before determining the CWS by the sending device.

4. The method according to claim 1, wherein one of the following:

when the reference physical channel sent by the sending device on the unlicensed carrier does not comprise a first CBG, the first information does not comprise first CBG-HARQ information corresponding to the first CBG; and when the reference physical channel sent by the sending device on the unlicensed carrier does not comprise a first CBG, the first information comprises first CBG-HARQ information corresponding to the first CBG.

5. The method according to claim 1, wherein one of the following:

the first BWP is a subset of the second BWP, and the first information comprises at least one of TB-HARQ information and CBG-HARQ information corresponding to the reference physical channel;

the second BWP is a subset of the first BWP, and the first information does not comprise TB-HARQ information corresponding to the reference physical channel; and the second BWP is a subset of the first BWP, and the first information comprises CBG-HARQ information corresponding to a CBG transmitted on the second BWP by the reference physical channel.

6. The method according to claim 1, wherein one of the following:

the sending device is a network device, a receiving device is a terminal device, and the reference physical channel is a physical downlink shared channel (PDSCH); and the sending device is a terminal device, a receiving device is a network device, and the reference physical channel is a physical shared channel (PUSCH).

7. A sending device, comprising:

a processor, configured to call and run a computer program from a memory, wherein the computer program comprises instructions for executing a channel detection method, the method comprising:

determining, by the sending device, a contention window size (CWS) for channel detection according to first information, wherein the first information comprises feedback information corresponding to a reference physical channel sent by the sending device on an unlicensed carrier, and the feedback information comprises at least one of transmission block-hybrid automatic repeat request (TB-HARQ) acknowledgment information and code block group-hybrid automatic repeat request (CBG-HARQ) information; and performing, by the sending device, channel detection on the unlicensed carrier according to the CWS;

wherein a resource assigned to the reference physical channel in frequency domain is a resource in a first bandwidth part (BWP); wherein, the performing, by the sending device, the channel detection on the unlicensed carrier according to the CWS comprises:

performing, by the sending device, the channel detection on a second BWP on the unlicensed carrier according to the CWS.

* * * * *